(12) United States Patent
Hopcraft et al.

(10) Patent No.: US 9,747,361 B2
(45) Date of Patent: Aug. 29, 2017

(54) SYSTEM AND METHOD FOR GROUPING AN UNBOUNDED DATASET INTO GROUPS THAT CAN BE SUBSEQUENTLY BINNED

(71) Applicant: Tektronix, Inc., Beaverton, OR (US)

(72) Inventors: Geoff Hopcraft, Piedmont, CA (US); Michael C. Gordon, Berkeley, CA (US)

(73) Assignee: NetScout Systems Texas, LLC, Westford, MA (US)

( * ) Notice: Subject to any disclaimer, the term of this patent is extended or adjusted under 35 U.S.C. 154(b) by 336 days.

(21) Appl. No.: 14/632,882

(22) Filed: Feb. 26, 2015

(65) Prior Publication Data
US 2016/0232223 A1 Aug. 11, 2016

Related U.S. Application Data

(60) Provisional application No. 62/113,260, filed on Feb. 6, 2015.

(51) Int. Cl.
*G06F 17/30* (2006.01)

(52) U.S. Cl.
CPC .............................. *G06F 17/30598* (2013.01)

(58) Field of Classification Search
CPC ......... G06F 17/30371; G06F 17/30377; G06F 17/30; G06F 17/30598
USPC .................................................. 707/600–899
See application file for complete search history.

(56) References Cited

U.S. PATENT DOCUMENTS 6,539,391 B1 * 3/2003 DuMouchel ........ G06F 17/3061

* cited by examiner

*Primary Examiner* — Isaac M Woo
(74) *Attorney, Agent, or Firm* — Locke Lord LLP; Scott D. Wofsy; Christopher J. Capelli

(57) ABSTRACT

A computer system to group a data set is provided, in which the computer system includes a memory configured to store instructions and a processor disposed in communication with the memory. The processor upon execution of the instructions is configured to access a data set including a plurality of data elements and associate the plurality of data elements with a plurality of data groups. The data set is assignable to a plurality of bins that are grouped differently than the plurality of data groups, wherein assignment of the data set to the plurality of bins is performed by accessing the plurality of data groups without accessing the data set or the plurality of data elements.

20 Claims, 7 Drawing Sheets

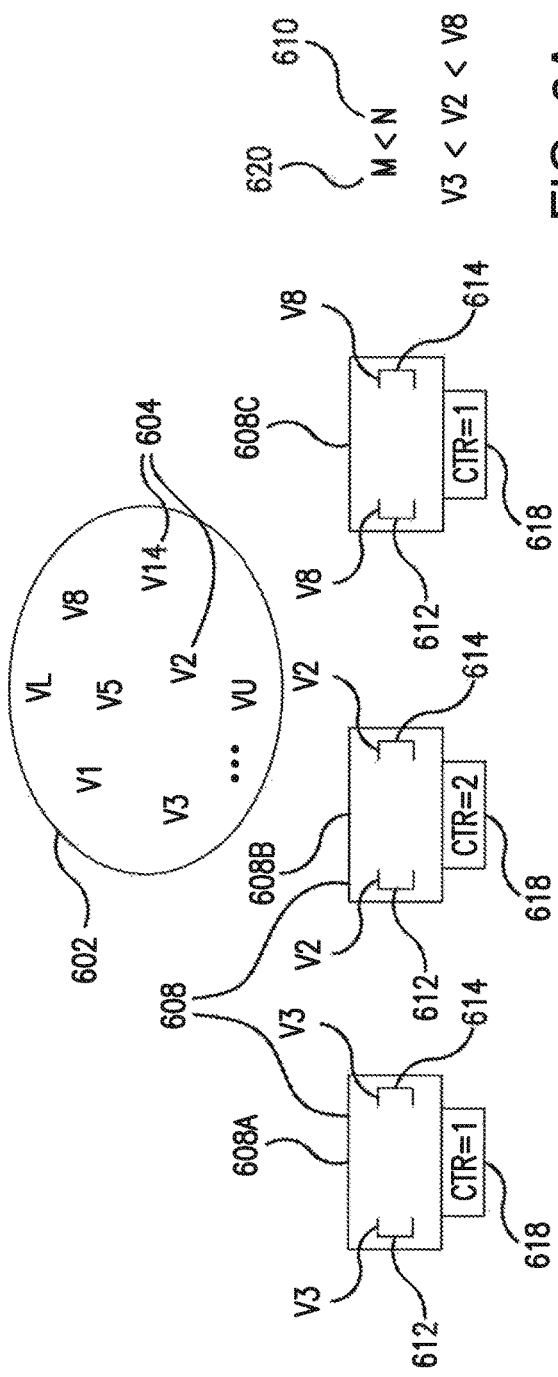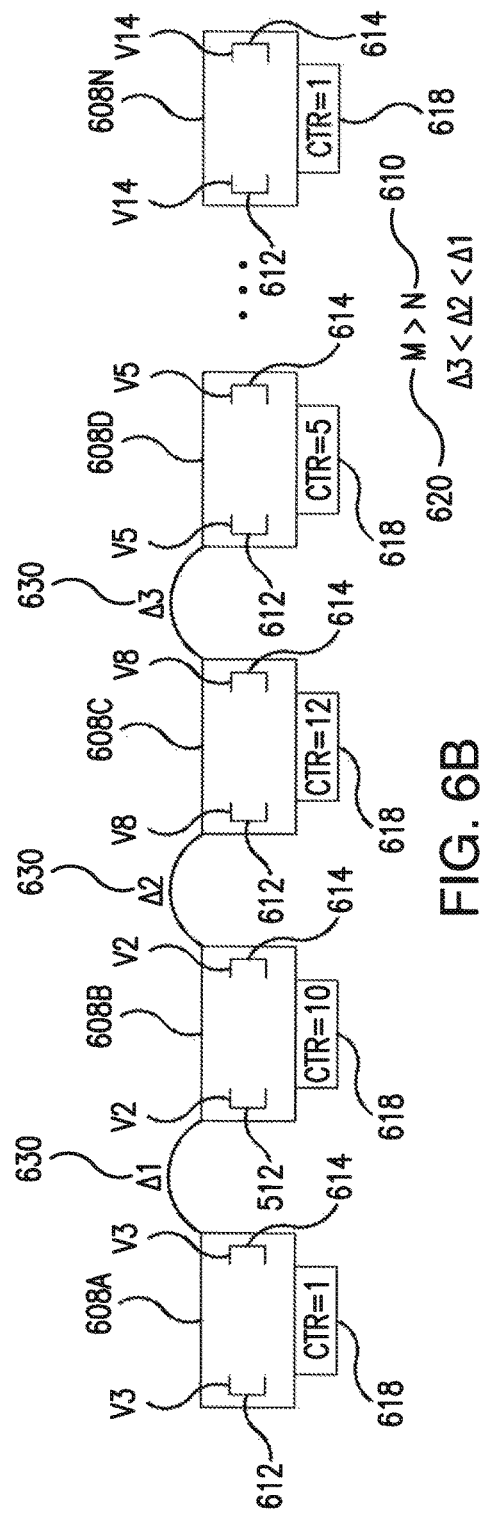
FIG. 6A
FIG. 6B

SYSTEM AND METHOD FOR GROUPING AN UNBOUNDED DATASET INTO GROUPS THAT CAN BE SUBSEQUENTLY BINNED

CROSS REFERENCE TO RELATED APPLICATIONS

This application claims priority to U.S. Patent Application Ser. No. 62/113,260 filed Feb. 6, 2015 which is incorporated herein by reference in its entirety.

FIELD OF THE INVENTION

The disclosed embodiments generally relates to grouping a large data set having an unknown bound into a plurality of data groups, and more particularly, forming data groups that use minimal storage resources and can be binned without consulting the data set.

BACKGROUND

A client device with limited storage resources may seek to access a large data set that consumes a large amount of storage resources. The client device may further seek to interact with the large data set to perform multiple binning processes on the large data set and to access binned information derived from the large data set.

In one scenario, the large data set can be stored by storage resources associated with a server. The client device can send requests to the server to bin the large data set. In this scenario, the client device sacrifices interactivity with the large data set for obtaining binning results.

In another scenario, the server transmits the large data set to the client device. The transmission consumes a large amount of network resources. Additionally, the client device then stores the large data set, thus consuming a large amount of the client device's own storage resources.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer system to group a data set is described in which the computer system includes a memory configured to store instructions and a processor disposed in communication with the memory. The processor upon execution of the instructions is configured to access a data set including a plurality of data elements and associate the plurality of data elements with a plurality of data groups. The data set is assignable to a plurality of bins that are grouped differently than the plurality of data groups, wherein assignment of the data set to the plurality of bins is performed by accessing the plurality of data groups without accessing the data set or the plurality of data elements.

In certain embodiments, a quantity of the plurality of data elements included in the data set and upper and lower bounds of values associated with the plurality of data elements are unknown. Furthermore, in embodiments, associating the plurality of data elements to the plurality of data groups is performed by accessing each of the plurality of data elements in the data set a single time. In certain embodiments, the plurality of bins are human-readable bins.

In embodiments, association of the plurality of data elements to the plurality of data groups includes accessing each of the plurality of data elements in the data set a single time. For each data element accessed, associating the data element to a selected data group of the plurality of data groups can be based on whether a value associated with the data element is inclusively between minimum and maximum values associated with the selected data group.

When the value associated with the data element is not inclusively between minimum and maximum values associated with any of the plurality of data groups, a new group can be added to the plurality of data groups in which the minimum and maximum values associated with the new group are equal to each other.

When the number of groups in the plurality of data groups exceeds a predetermined value, two data groups can be merged. The two data groups merged can have the lowest determined delta between the two data groups relative to other deltas determined between the plurality of data groups. A resulting merged data group can have an associated minimum value that is a lower one of the minimum values associated with the two data groups, an associated maximum value that is the higher one of the maximum values associated with the two groups, and a counter indicating an amount of data elements associated with a sum of the data elements associated with the two data groups.

The data elements can be represented as floating point integers having at least one digit. The delta can be determined between the plurality of data groups based on a most-significant place digit P that is different between pairs of adjacent groups of the plurality of data groups when the data groups are ranked in an order. The order can be based on a comparison between the minimum value of the plurality of data groups and a maximum value of other groups of the plurality of data groups, and a range R. The range R can be the difference between a minimum value associated with a lower ranked data group of adjacent ranked data groups and a maximum value of a higher ranked data group of the adjacent ranked data groups. The delta can indicates a significance of digits that vary and a magnitude of separation between the pairs of adjacent groups of the plurality of data groups when the plurality of data groups are ranked in an order, the order being based on a comparison between the minimum value of the first plurality of data groups and a maximum value of other groups of the s.

In another aspect, a computer-implemented method to group a data set is provided. The method includes accessing by at least one processor a data set including a plurality of data elements, and associating by the at least one processor the plurality of data elements with a plurality of data groups, wherein the data set is assignable to a plurality of bins that are grouped differently than the plurality of data groups. Assignment of the data set to the plurality of bins is performed by accessing the plurality of data groups without accessing the data set or the plurality of data element.

In another aspect still, a non-transitory computer readable storage medium is provided, and one or more computer programs are embedded therein. The computer programs comprise instructions, which when executed by a computer system, cause the computer system to access a data set including a plurality of data elements and associate the plurality of data elements with a plurality of data groups, wherein the data set is assignable to a plurality of bins that are grouped differently than the plurality of data groups. Assignment of the data set to the plurality of bins is performed by accessing the plurality of data groups without accessing the data set or the plurality of data elements.

BRIEF DESCRIPTION OF THE DRAWINGS

The accompanying appendices and/or drawings illustrate various non-limiting, example, inventive aspects in accordance with the present disclosure:

FIGS. 6A-6C are schematic diagrams illustrating a method of grouping data elements of a data set in accordance with the disclosure; and.

DETAILED DESCRIPTION OF CERTAIN EMBODIMENTS

Figure 1:
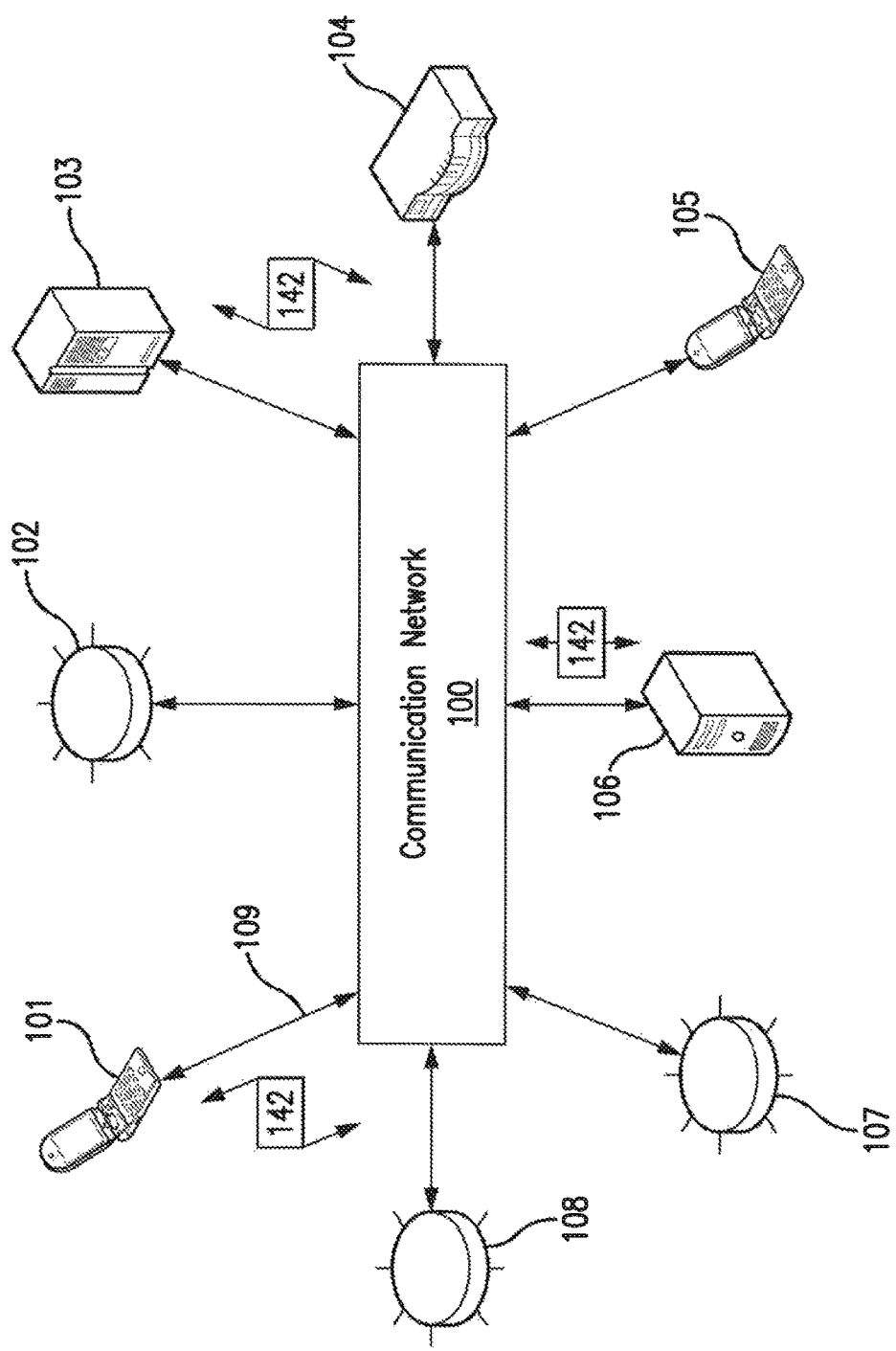
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary general-purpose computing system in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
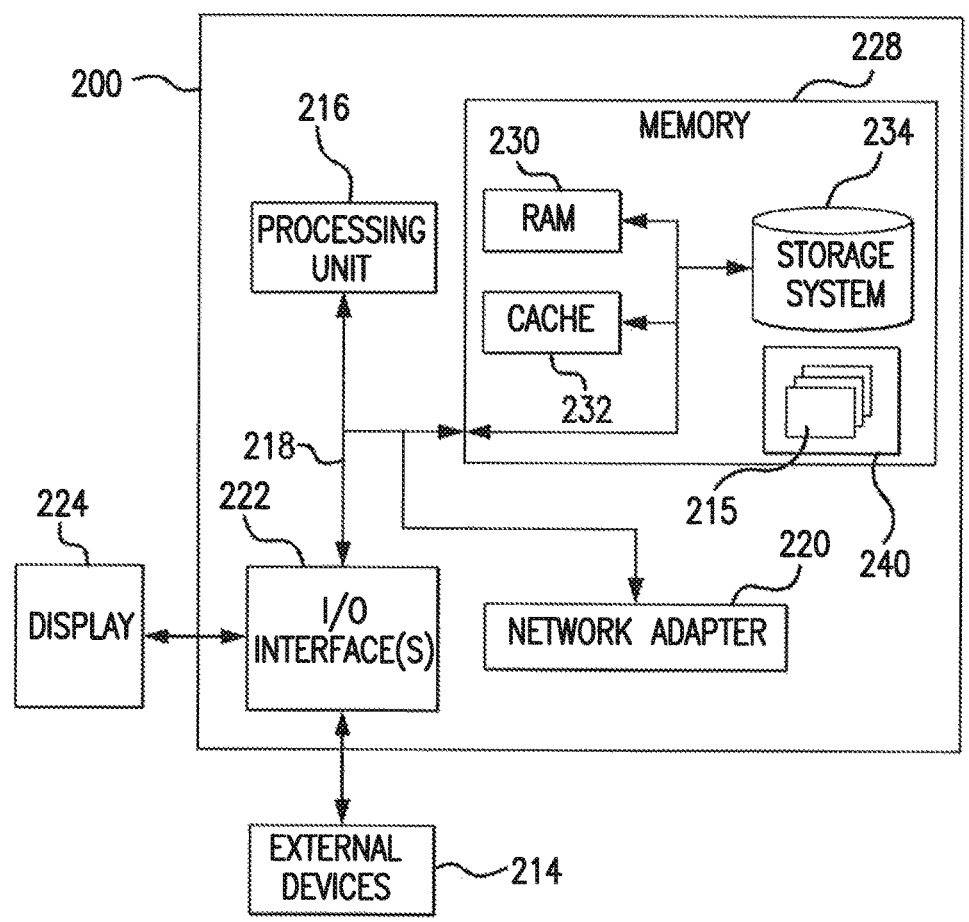
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

In the description that follows, certain embodiments may be described with reference to acts and symbolic representations of operations that are performed by one or more computing devices, such as the computing device 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
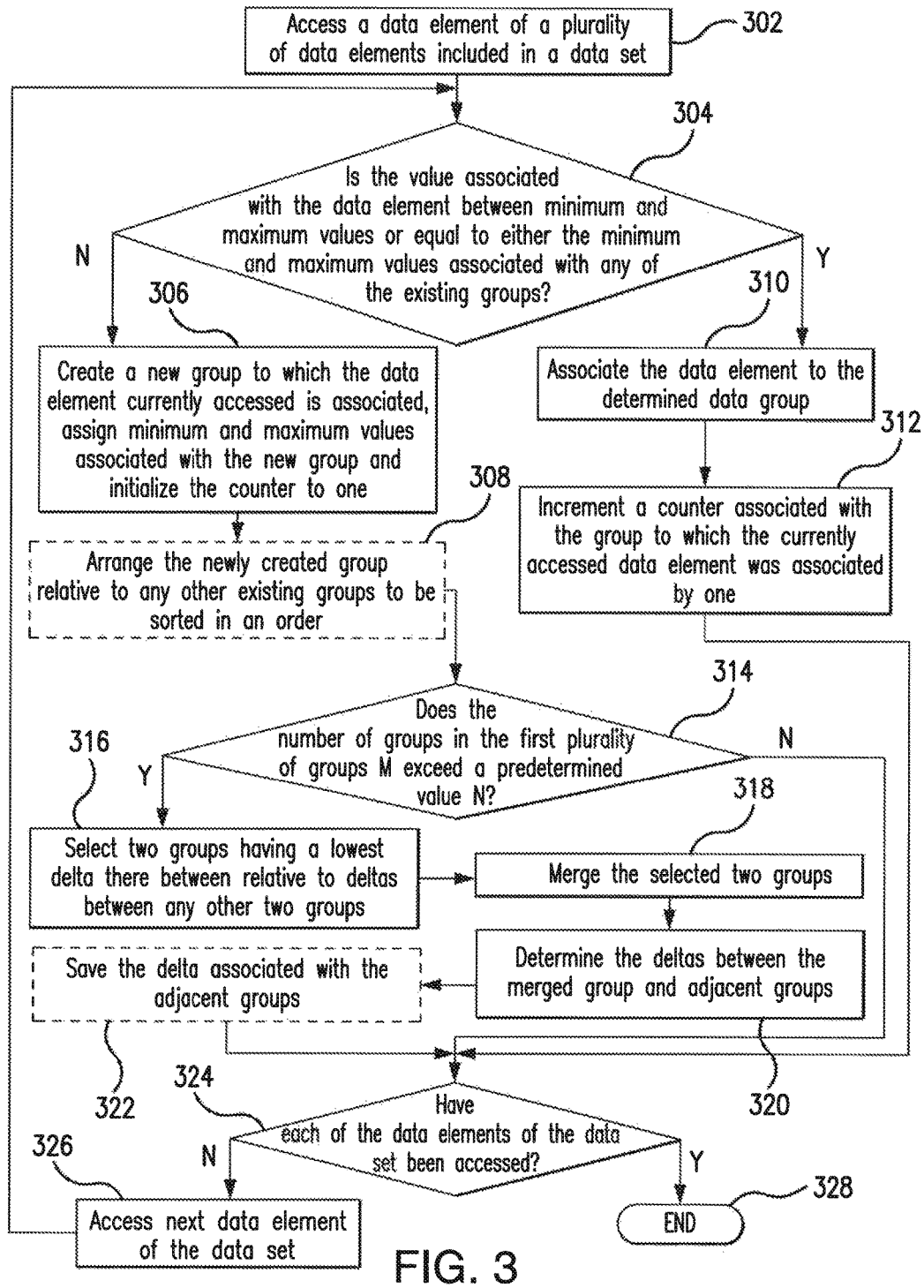
FIG. 3 is a flowchart illustrating an exemplary method of grouping the data elements, in accordance with the disclosure.
Figure 4:
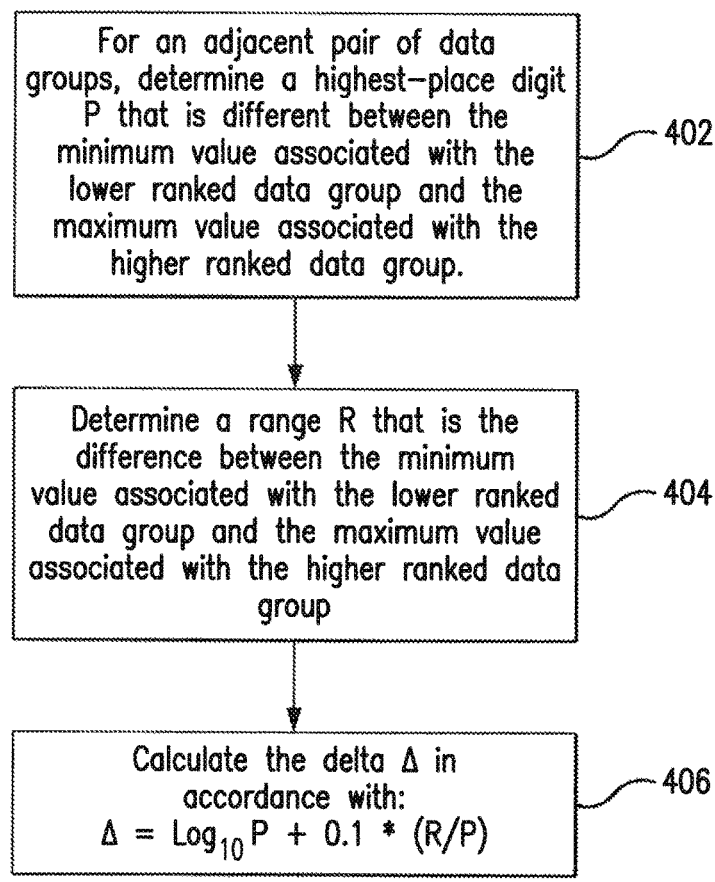
FIG. 4 is a flowchart illustrating an exemplary method of determining a delta between adjacent groups of data elements as used in the method of grouping the data elements shown in FIG. 3.

With the exemplary communication network 100 (FIG. 1) and computing device 200 (FIG. 2) being generally shown and discussed above, description of certain illustrated embodiments of the present invention will now be provided. With reference now to FIGS. 3 and 4, shown are flowcharts demonstrating implementation of the various exemplary embodiments. It is noted that the order of steps shown in FIGS. 3 and 4 is not required, so in principle, the various steps may be performed out of the illustrated order. Also certain steps may be skipped, different steps may be added or substituted, or selected steps or groups of steps may be performed in a separate application following the embodiments described herein.

Turning now to FIG. 3, a flowchart is shown that illustrates a method to group data elements of a large data set. Once grouped, the data set can be binned or re-binned by accessing the data groups, but without accessing the data elements of the data set. The size of the data set, values of the data elements and the range of values of data elements in the data set can be unknown. N is selected to be a maximum number of data groups that can be formed. N can be selected to accommodate the tightest binning granularity that would be expected to be requested in a subsequent request for binning or re-binning.

In many applications, the results of a binning request are displayed on a display device, such as in the form of a histogram. The value for N can be constrained by the resolution of the display device. For binning results that are to be displayed on a client's display device, wherein the display device is the screen for a desktop computer, $N \leq 2000$ can provide results to a user that can be displayed on the display device and visible to a user. If a user were to request that a data set be binned into a number of bins that is greater than the number of visible pixels of the display device, not all of the bins would be visible to a user.

Additionally, the value for N can be constrained by the amount of information a user can visually understand. In many examples, a user can perceive and understand up to about 50 bins of information. When the number of bins exceeds 50, the user may not be able to perceive or comprehend some of the information. Experimentation has demonstrated that even for highly sophisticated results with high display resolution, N=6000 is sufficient, and the N=1000 is sufficient for most uses.

At operation 302, a data element of the plurality of data elements included in the data set is accessed. At operation 304, a determination is made whether the value associated with the data element is inclusively between (between or equal to) minimum and maximum values associated with any of already existing data groups.

If the determination at operation 304 is YES, then at operation 310, the currently accessed data element is associated with the determined data group. At operation 312, a counter associated with the data group to which the currently accessed data element is associated is incremented by one. The method continues at operation 324.

If the determination at operation 304 is NO, then at operation 306, a data group is created to which the data element currently accessed is associated. Creating the new data group includes assigning a minimum and maximum value to the newly created data group that includes the data element, wherein the minimum and maximum values are both set equal to a value of the currently accessed data element. The counter associated with the data group is initialized to be one.

At operation 308, the newly created data group is arranged relative to any other existing data groups so that all of the data groups are sorted into an order (e.g., ascending or descending), wherein the order is based on the value of the minimum or maximum values associated with the data groups. When arranged in a ranked order, the maximum value of each data group is less than the minimum value of an adjacent higher ranked data group. The method continues at operation 314.

At operation 314, a determination is made whether the total number of data groups M exceeds a predetermined value N. If the determination at operation 314 is YES, then at operation 316, two data groups are selected that have a lowest delta between them relative to deltas between any other two data groups. The calculation of the delta indicates the significance of digits that vary, by assigning a lower delta when two data groups vary in digits of lower significance (also referred to as least-significant) relative to data groups that vary in digits of higher significance (also referred to as most-significant). The delta also indicates the magnitude of separation between the two groups. By selecting two data groups that have the lowest delta, the two data groups selected vary only in the least significant decimal places relative to other groups, and have the smallest magnitude of separation between them.

At operation 318, the selected two data groups are merged. Merging the selected two data groups includes forming a single data group that replaces the two data groups. The merged data group includes all of the data elements that were included in the two data groups. The minimum associated with the merged data group is assigned the value of the lower minimum of the two data groups, and the maximum associated with the new data group is assigned the value of the higher maximum of the two data groups. The count associated with the new data group is the sum of the counts of the two data groups. At operation 320, the deltas between the merged data group and adjacent data groups is determined. At operation 322, the determined deltas are saved in association with the merged data group and each of its adjacent data groups.

If the determination at operation 314 is NO, the method continues at operation 324. At operation 324, a determination is made whether each of the data elements of the data set have been accessed. If the determination at operation 324 is NO, then at operation 326 the next data element of the data set is accessed. If the determination at operation 324 is YES, then at operation 328, the method ends.

Operations 308 and 322 are shown in dotted lines to indicate that the operations are optional, but can provide computational efficiency.

All of the data elements included in the dataset can be associated with a data group in a single pass through the data set in which each data element is accessed a single time. The data groups each include a minimum value, a maximum value and a counter. The data elements that were associated with the data groups are not included in the data groups. Rather, the data elements are associated with the data groups and used to assign the minimum and maximum values and the counters associated with data groups.

With reference to FIG. 4, a flowchart is shown that illustrates an example method, without limitation thereto, to determine the delta between two adjacent groups in accordance with operation 320. The delta is calculated to indicate the significance of digits that vary and the magnitude of separation between the two groups. The operations described are not meant to limit the method of the disclosure, and can be substituted with different operations that indicate the significance of digits that vary and the magnitude of separation between the two groups.

Since the data groups have been previously sorted by maintaining the data groups in a sorted order each time a new data group is added at operation 408, adjacent data groups can be efficiently determined. However, if the sorted order has not been maintained, a procedure can be performed to determine adjacent data groups before performing operation 402.

At operation 402, for an adjacent pair of data groups, P is determined, wherein P is a highest-place (also referred to as most significant) digit that is different when comparing the minimum value associated with the lower ranked data group and the maximum value associated with the higher ranked data group. At operation 404, a range R is determined, wherein R is the difference between the minimum value associated with the lower ranked data group and the maximum value associated with the higher ranked data group. At operation 406, the delta $\Delta$ for the adjacent pair is calculated in accordance with example Equation (1):

$$\Delta = \mathrm{Log}_{10} P + 0.1 * (R/P) \qquad (1)$$

Equation (1) is provided by way of example, and different equations are contemplated that also indicate the significance of digits that vary and the magnitude of separation between the adjacent pair of data groups.

The method illustrated in FIGS. 3 and 4 can be performed by a server device, such as server 106 shown in FIG. 1 to group the data of a dataset. The data can be initially grouped by the server device in preparation for binning requests, or in response to a request from a client device. The client device, such as client computing device 103 shown in FIG. 1 can submit a request to group the data set. The request can include, for example, the maximum number of groups N to be used for grouping the data set. In response to the request, the server device can provide the data groups for the data set to the client device. Each data group includes a minimum value, maximum value and counter. The data elements associated with the groups are not included in the groups. Accordingly, the data groups occupy a relatively small amount of data in comparison with the data set. The reduced amount of data minimizes the amount of data that is transmitted from the server device to the client device. Additionally, the reduced amount of data minimizes the amount of storage, including volatile (e.g., Random Access Memory) and nonvolatile memory space, used by the client device to store the data groups. For example, a large data set that includes, for example, millions of data elements, can be grouped into 1,000 or less data groups that consume 50 Kbytes of memory. Compression ratios of memory space consumed by the data set relative to the memory space consumed by the data groups can be multi-millions: one.

Additionally, the grouping can be performed without knowledge, before or during the grouping process, of the upper and lower bounds of the data set, the values of the data elements, or the number of data elements. Thus, the grouping process can be performed in real time, even as the data set is growing. Furthermore, the data groups can be updated at any time, even after grouping has been performed, with newly added data elements. In embodiments, the grouping process can be performed using map production, such as wherein multiple devices collaborate to group the data set.

Figure 5:
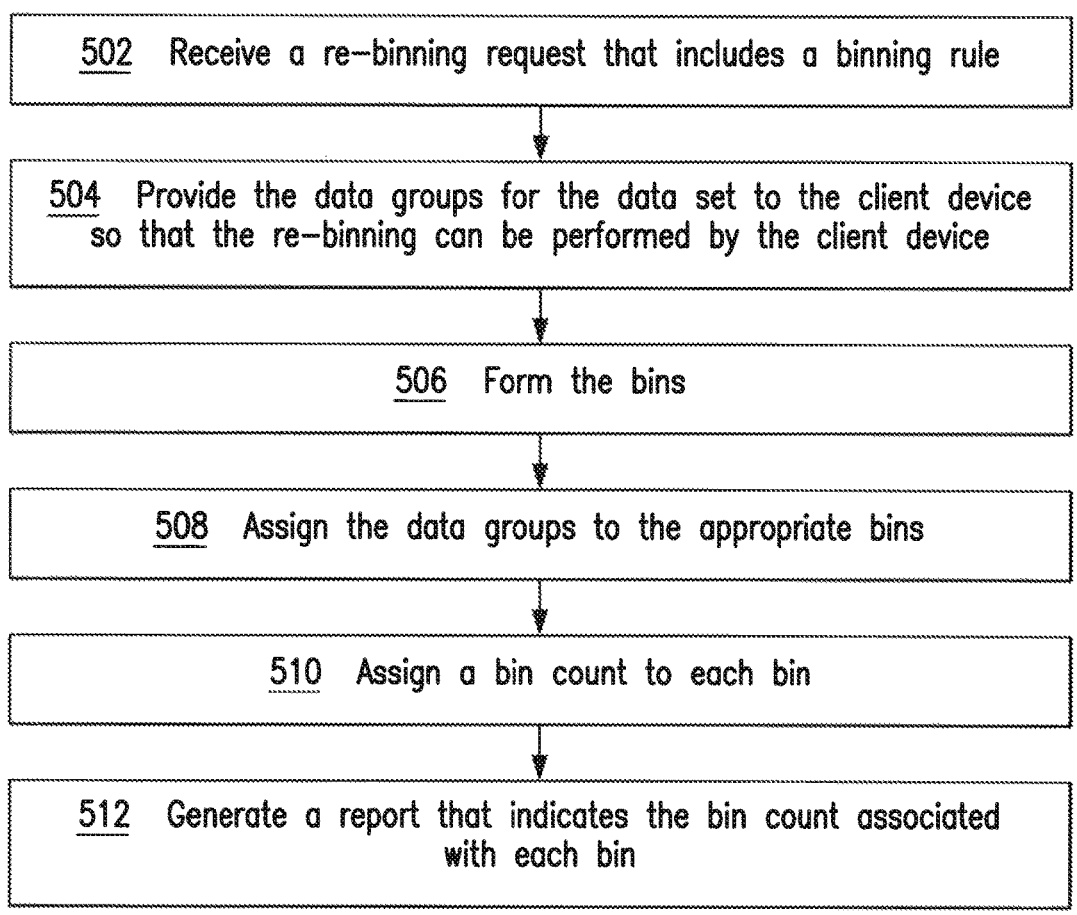
FIG. 5 is a flowchart illustrating an exemplary method of binning data groups of the data set.

With reference to FIG. 5, a flowchart 500 illustrates an example method for re-binning the data set after it has been grouped. At operation 502, a re-binning request is received. In a certain embodiment, the re-binning is performed by the client device, such as client computing device 103 shown in FIG. 1, and the request is received by a processor of the client device. In an embodiment, the re-binning is performed by the server device, and the re-binning request is received by a processor of the server device. The re-binning request can be entered by a user operating the client device, e.g., via a GUI, or by a processing device. The re-binning request includes a re-binning rule that can specify, for example, the number of bins B to be used for re-binning the data set, interval sizes of the bins, and/or the range of values that the set of bins should cover. At operation 504, in an embodiment in which the binning is performed by the client device, the server device can provide the data groups for the data set to the client device so that the re-binning can be performed by the client device. In an embodiment in which the re-binning is be performed by the server device, operation 504 can be omitted.

At operation 506, the bins are formed, including associating each bin with an interval that lies between to values. At operation 508, data groups are assigned to the bins. A data group is assigned to bin when the data group's associated minimum and maximum values define a range which is completely included within the interval associated with the bin. Since the method includes only consulting the minimum and maximum values associated with a group, the re-binning can be performed without referring to the data set or the data elements themselves.

At operation 510, a bin count is assigned to each bin. The bin count for a bin is equal to the sum of the counts associated with each data group assigned to the bin.

At operation 512, a report is generated that indicates the bin count associated with each bin. The report can be displayed or otherwise communicated to a user or processor. The report can include, for example, a graphical or textual representation that represents numeric or statistical data. For example, a graphical representation can include a histogram having bars associated with the respective bins, wherein the height of each bar corresponds to the bin count of the associated bin.

A minimal number of digits can be used to represent the lower and upper range limits of the bins based on the degree of accuracy needed, maximizing human readability of the bins. For instance, the number of digits used can be selected based on the binning request and granularity desired. The bin range limits and minimum and maximum values associated with the groups can be represented as floating point numbers (e.g., using scientific notation and minimal digits) with a high degree of accuracy while using minimal digits for preserving human readability.

Since the computation of the delta for determining the groups to be combined prioritizes combining groups varying in lower decimal places rather than groups that vary in higher decimal places, each group can be entirely included in a single bin without overlapping an upper or lower boundary of the bin or spanning multiple bins. The absence of overlapping avoids the need to split data groups or use heuristics, and thus preserves accuracy.

Figure 6C:
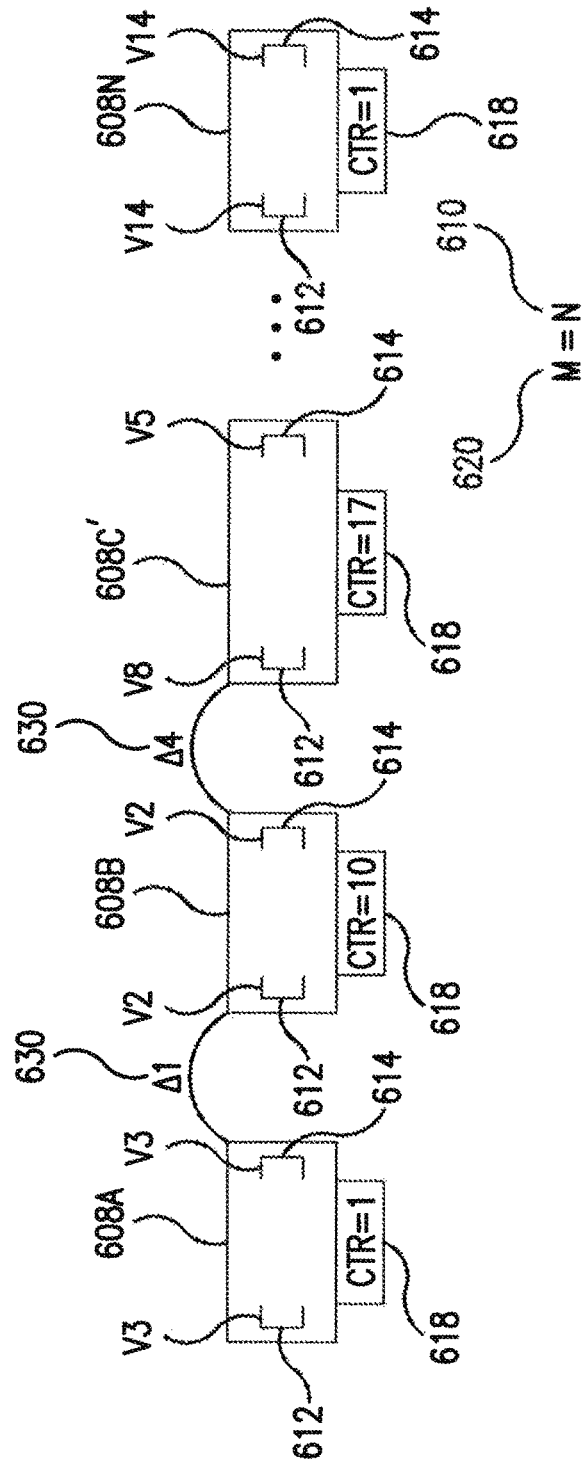

Turning now to FIGS. 6A-6C, an example process for grouping data set 602 having a plurality of data elements 604 into a plurality of data groups 608 is illustrated. The data set 602 can have any amount of data elements 604, and this amount can be unknown before the grouping is performed and remain unknown during performance of the grouping. The data elements 604 each have an associated value. The values of the data elements 604, the distribution of the values of the data elements 604 and the lower or upper boundaries of the values of data elements 604 (shown as data elements 604 LV and UV) can be unknown before the grouping is performed and during performance of the grouping.

When the grouping is completed such that all of the data elements 604 are assigned to a data group, the data groups can be reconfigured (e.g., re-binned) into different data groups (e.g., bins), without consulting the data elements 604 in the original data set 602. The re-binning can be open-ended, such that any number of bins and configuration of bins (e.g., minimum and maximum values associated with the individual bins) can be used.

FIG. 6A is a schematic diagram showing an illustrative stage 1 of the grouping procedure, in which a maximum number of data groups (N) 610 is selected and an initial set of data groups 608 is generated. Each data group 608 has an associated minimum value 612, maximum value 614, and counter value (CTR) 618. In the example stage 1 shown, the current number of data groups M 620 is equal to three.

The first data element 604 accessed has value V3. Since no data groups 608 exist yet, a first data group 608A is formed with an associated minimum value 612=V3, a maximum value 614=V3, and CTR 618=1, indicating that a single data element 602 having value V3 is associated with this data group 608A. Since only one data group 608 exists, M 620=1, and M 620<N 610. Hence, there is not requirement to merge any of the data groups 608, and a next data element 604 can be accessed.

The next data element 604 accessed has value V2. However, when it is determined that V2 does not lie inclusively between the minimum and maximum value 612, 614 of data group 608A, both being equal to V3, a new data group 608B is added. Data group 608B is formed with an associated minimum value 612=V2, a maximum value 614=V2, and CTR 618=1, indicating that a single data element 602 having value V2 is associated with this data group 608B. Since only two data groups 608 exist, M 620=2, and M 620<N 610. Hence, there is not requirement to merge any of the data groups 608, and a next data element 604 can be accessed.

The next data element 604 accessed has value V1. It is determined that V1=V2, and therefore lies inclusively between the minimum and maximum value 612, 614 of data group 608B. Accordingly, the data element 604 having value V1 is associated with data group 608B. The minimum and maximum values 612, 614 for data group 608B do not change, but the counter CTR 618 is incremented so that CTR 618=2. Since only two data groups 608 still exist, M 620=2, and still M 620<N 610. Hence, there is not requirement to merge any of the data groups 608, and a next data element 604 can be accessed. A delta (not shown) between data groups 608A and 608B can be determined.

The next data element 604 accessed has value V8. However, when it is determined that V8 does not lie inclusively between the minimum and maximum value 612, 614 of data groups 608A or 608B, a new data group 608C is added. Data group 608C is formed with an associated minimum value 612=V8, a maximum value 614=V8, and CTR 618=1, indicating that a single data element 602 having value V8 is associated with this data group 608C. Since three data groups 608 now exist, M 620=3, and still M 620<N 610. Hence, there is not requirement to merge any of the data groups 608, and a next data element 604 can be accessed.

The data groups 608 are arranged in a ranked order as shown, in which the maximum value of each data group 608 is less than the minimum value of an adjacent higher ranked data group 608. The data groups 608A-C are illustrated in a ranked order, based on V3<V2<V8. A delta (not shown) between the adjacent data groups can be determined.

There is no requirement that the data groups 608 be sorted. However computational efficiency can be improved by sorting the data groups into a ranked order in which the maximum value of each data group is less than the minimum value of the next ranked data group.

With reference to FIG. 6B, a later stage is shown after the process of assigning data elements 204 to data groups 608 has proceeded. At the stage shown in FIG. 6B, data groups 608D-608N, having been added relative to the stage shown in FIG. 6A. The data elements 604 may have been accessed and associated with a data group 608 one at a time, or more than one data elements 604 may have been accessed and associated with data groups 608 simultaneously. A single pass through data set 602 is performed, in which each data element 604 is accessed a single time from the data set 602 for grouping the data elements 604.

The counters CTR 618 associated with each of the data groups 608A-608N were incremented in accordance with the number of data elements 604 associated with each data group 608. For each of the data groups 608A-608N the minimum value 612=maximum value 614, and no merge operations have been performed. The data groups 608A-608N have been arranged into a ranked order. Deltas 630 (Δ1, Δ2, and Δ3) were determined for each adjacent pair of data groups 608A. In the stage illustrated in FIG. 6B, a condition has occurred in which M 620>N 610. Accordingly, a merge operation shall be performed on a pair of adjacent data groups 608 having the smallest delta 630. A determination is made that the delta 630 between data group 608C and data group 608D is the smallest delta 630. Accordingly, a merge process is performed to merge data groups 608C and 608D.

FIG. 6C shows another stage of grouping the data set in which delta groups 608C and 608D have been merged into data group 608C'. The minimum value 612 associated with data group 608C' is assigned the value of the lower minimum value of the data groups 608C and 608D. Accordingly, the minimum value 612 associated with data group 608C' is assigned to be V8, because V8 was determined to be less than V6. The maximum value 614 associated with data group 608C' is assigned the value of the higher maximum value of the data groups 608C and 608D. Accordingly, the maximum value 614 associated with data group 608C' is assigned to be V6, because V6 was determined to be higher than V8. The CTR 618 associated with data group 608C' is assigned the value 17, which is the sum of CTR 618=12 of data group 608C and CTR 618=6 of data group 608D. After the merge operation, the deltas 630 between the merged data group 608C ' are determined. As shown, the delta 630 between data group 608B and data group 608C' is determined to be Δ4. After the merge operation M 620=N 610, the method can continue by accessing a next data element.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer system to group a data set, comprising:
   a memory configured to store instructions;
   a processor disposed in communication with said memory, wherein said processor upon execution of the instructions is configured to:
   access a data set including a plurality of data elements; and
   associate the plurality of data elements with a plurality of data groups, the data set being assignable to a plurality of bins that are grouped differently than the plurality of data groups, assignment of the data set to the plurality of bins being performed by accessing the plurality of data groups without accessing the data set or the plurality of data elements, and accessing each of the plurality of data elements in the data set a single time such that for each data element accessed, associating the data element to a selected data group of the plurality of data groups based on whether a value associated with the data element is inclusively between minimum and maximum values associated with the selected data group.

2. The computer system according to claim 1, wherein a quantity of the plurality of data elements included in the data set and upper and lower bounds of values associated with the plurality of data elements are unknown.

3. The computer system according to claim 1, wherein associating the plurality of data elements to the plurality of data groups is performed by accessing each of the plurality of data elements in the data set a single time.

4. The computer system according to claim 1, wherein the plurality of bins are human-readable bins.

5. The computer system according to claim 1, wherein association of the plurality of data elements to the plurality of data groups includes:
when the value associated with the data element is not inclusively between minimum and maximum values associated with any of the plurality of data groups, adding a new group to the plurality of data groups in which the associated minimum and maximum values are equal to each other; and
when the number of groups in the plurality of data groups exceeds a predetermined value, merging two data groups having a lowest determined delta between the two data groups relative to other deltas determined between the plurality of data groups, a resulting merged data group having an associated minimum value that is a lower one of the minimum values associated with the two data groups, an associated maximum value that is the higher one of the maximum values associated with the two groups, and a counter indicating an amount of data elements associated with a sum of the data elements associated with the two data groups.

6. The computer system according to claim 5, wherein the data elements are represented as floating point integers having at least one digit.

7. The computer system according to claim 5, wherein the delta is determined between the plurality of data groups based on a most-significant place digit P that is different between pairs of adjacent groups of the plurality of data groups when the plurality of data groups are ranked in an order, the order being based on a comparison between the minimum value of the plurality of data groups and a maximum value of other groups of the plurality of data groups, and a range R, the range R being the difference between a minimum value associated with a lower ranked data group of adjacent ranked data groups and a maximum value of a higher ranked data group of the adjacent ranked data groups.

8. The computer system according to claim 5, wherein the delta indicates a significance of digits that vary and a magnitude of separation between the pairs of adjacent groups of the plurality of data groups when the plurality of data groups are ranked in an order, the order being based on a comparison between the minimum value of the plurality of data groups and a maximum value of other groups of the plurality of groups.

9. A computer-implemented method to group a data set, the method comprising:
accessing by at least one processor a data set including a plurality of data elements; and
associating by the at least one processor the plurality of data elements with a plurality of data groups, the data set being assignable to a plurality of bins that are grouped differently than the plurality of data groups, assignment of the data set to the plurality of bins being performed by accessing the plurality of data groups without accessing the data set or the plurality of data element, and accessing each of the plurality of data elements in the data set a single time such that for each data element accessed, associating the data element to a selected data group of the plurality of data groups based on whether a value associated with the data element is inclusively between minimum and maximum values associated with the selected data group.

10. The computer-implemented method according to claim 9, wherein a quantity of the plurality of data elements included in the data set and upper and lower bounds of values associated with the plurality of data elements are unknown.

11. The computer-implemented method according to claim 9, wherein association of the plurality of data elements to the plurality of data groups is performed by accessing each of the plurality of data elements in the data set a single time.

12. The computer-implemented method according to claim 9, wherein the plurality of bins are human-readable bins.

13. The computer-implemented method according to claim 9, wherein associating the data elements with the plurality of data groups includes:
when the value associated with the data element is not inclusively between minimum and maximum values associated with any of the plurality of data groups, adding a new group to the plurality of data groups in which the associated minimum and maximum values are equal to each other; and
when the number of groups in the plurality of data groups exceeds a predetermined value, merging two data groups having a lowest determined delta between the two data groups relative to other deltas determined between the plurality of data groups, a resulting merged data group having an associated minimum value that is a lower one of the minimum values associated with the two data groups, an associated maximum value that is the higher one of the maximum values associated with the two groups, and a counter indicating an amount of data elements associated with a sum of the data elements associated with the two data groups.

14. The computer-implemented method according to claim 13, wherein the data elements are represented as floating point integers having at least one digit.

15. The computer-implemented method according to claim 13, further comprising determining the delta between the plurality of data groups based on a most-significant place digit P that is different between pairs of adjacent groups of the plurality of data groups when the data groups are ranked in an order, the order being based on a comparison between the minimum value of the plurality of data groups and a maximum value of other groups of the plurality of data groups, and a range R, the range R being the difference between a minimum value associated with a lower ranked data group of adjacent ranked data groups and, a maximum value of a higher ranked data group of the adjacent ranked data groups.

16. The computer-implemented method according to claim 13, further comprising calculating the delta, wherein the delta indicates a significance of digits that vary and a magnitude of separation between the pairs of adjacent groups of the plurality of data groups when the plurality of data groups are ranked in an order, the order being based on a comparison between the minimum value of the plurality of data groups and a maximum value of other groups of the plurality of groups.

17. A non-transitory computer readable storage medium and one or more computer programs embedded therein, the computer programs comprising instructions, which when executed by a computer system, cause the computer system to:

access a data set including a plurality of data elements; and associate the plurality of data elements with a plurality of data groups, the data set being assignable to a plurality of bins that are grouped differently than the plurality of data groups, assignment of the data set to the plurality of bins being performed by accessing the plurality of data groups without accessing the data set or the plurality of data elements, and accessing each of the plurality of data elements in the data set a single time such that for each data element accessed, associating the data element to a selected data group of the plurality of data groups based on whether a value associated with the data element is inclusively between minimum and maximum values associated with the selected data group.

18. The non-transitory computer readable storage medium and one or more computer programs embedded therein according to claim 17, wherein the instructions, which when executed by the computer system, further cause the computer system to associate the plurality of data elements to the plurality of data groups by:

when the value associated with the data element is not inclusively between minimum and maximum values associated with any of the plurality of data groups, adding a new group to the plurality of data groups in which the associated minimum and maximum values are equal to each other; and when the number of groups in the plurality of data groups exceeds a predetermined value, merging two data groups having a lowest determined delta between the two data groups relative to other deltas determined between the plurality of data groups, a resulting merged data group having an associated minimum value that is a lower one of the minimum values associated with the two data groups, an associated maximum value that is the higher one of the maximum values associated with the two groups, and a counter indicating an amount of data elements associated with a sum of the data elements associated with the two data groups.

19. The non-transitory computer readable storage medium and one or more computer programs embedded therein, according to claim 18, wherein the data elements are represented as floating point integers having at least one digit, and wherein the instructions, which when executed by the computer system, further cause the computer system to determine the delta between the plurality of data groups based on a most-significant place digit P that is different between pairs of adjacent groups of the plurality of data groups when the data groups are ranked in an order, the order being based on a comparison between the minimum value of the plurality of data groups and a maximum value of other groups of the plurality of data groups, and a range R, the range R being the difference between a minimum value associated with a lower ranked data group of adjacent ranked data groups and a maximum value of a higher ranked data group of the adjacent ranked data groups.

20. The non-transitory computer readable storage medium and one or more computer programs embedded therein according to claim 18, wherein the instructions, which when executed by a computer system, further cause the computer system to calculate the delta, wherein the delta indicates a significance of digits that vary and a magnitude of separation between the pairs of adjacent groups of the plurality of data groups when the plurality of data groups are ranked in an order, the order being based on a comparison between the minimum value of the plurality of data groups and a maximum value of other groups of the plurality of groups.

* * * * *